(12) United States Patent
Yokoyama et al.

(10) Patent No.: US 12,153,838 B2
(45) Date of Patent: Nov. 26, 2024

(54) IMAGE FORMING APPARATUS, SYSTEM, AND METHOD FOR DETECTING MALFUNCTION

(71) Applicants: Takuhei Yokoyama, Kanagawa (JP); Ayumu Hashimoto, Kanagawa (JP); Shogo Nakamura, Kanagawa (JP); Akito Yoshimura, Kanagawa (JP); Masaki Yoshino, Kanagawa (JP); Keiji Kunimi, Kanagawa (JP)

(72) Inventors: Takuhei Yokoyama, Kanagawa (JP); Ayumu Hashimoto, Kanagawa (JP); Shogo Nakamura, Kanagawa (JP); Akito Yoshimura, Kanagawa (JP); Masaki Yoshino, Kanagawa (JP); Keiji Kunimi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/234,878

(22) Filed: Aug. 17, 2023

(65) Prior Publication Data

US 2024/0069823 A1    Feb. 29, 2024

(30) Foreign Application Priority Data

Aug. 30, 2022 (JP) ................. 2022-136792

(51) Int. Cl.
  *G06F 3/12* (2006.01)

(52) U.S. Cl.
  CPC ........... *G06F 3/121* (2013.01); *G06F 3/1234* (2013.01)

(58) Field of Classification Search
  CPC ...... G06F 3/121; G06F 3/1234; G06F 3/1207; G06F 3/1221; G03G 2221/1675; G03G 2215/00548; G06G 2215/00341; G06G 2215/00552; G06G 21/1638; H04N 1/00543
  See application file for complete search history.

(56) References Cited

U.S. PATENT DOCUMENTS

| | | |
|---|---|---|
| 6,276,772 B1 | 8/2001 | Sakata et al. |
| 2005/0286078 A1 | 12/2005 | Maruyama |
| 2011/0043592 A1 | 2/2011 | Kinoshita et al. |
| 2012/0056961 A1 | 3/2012 | Kinoshita et al. |
| 2012/0062681 A1 | 3/2012 | Miyadera et al. |

(Continued)

FOREIGN PATENT DOCUMENTS

| | | |
|---|---|---|
| JP | 2000-020273 A | 1/2000 |
| JP | 2006-031677 A | 2/2006 |
| JP | 2008-042821 A | 2/2008 |

OTHER PUBLICATIONS

Machine translated document of CN 113650428 A (Xue, Published Nov. 16, 2021) (Year: 2021).*

(Continued)

*Primary Examiner* — Juan M Guillermety
(74) *Attorney, Agent, or Firm* — XSENSUS LLP

(57) ABSTRACT

An image forming apparatus, a system, and a method. The image forming apparatus includes an image forming engine to form an image on a recording medium, interrupts an image formation by the image forming engine in response to a malfunction, detects a recording medium on which the image formation is interrupted, and notifies an external device of a detection result of the recording medium.

19 Claims, 12 Drawing Sheets

(56) References Cited

U.S. PATENT DOCUMENTS

| | | |
|---|---|---|
| 2012/0062682 A1 | 3/2012 | Komai et al. |
| 2012/0147114 A1 | 6/2012 | Yokoyama et al. |
| 2012/0154827 A1 | 6/2012 | Shirasaki et al. |
| 2012/0262750 A1 | 10/2012 | Kinoshita et al. |
| 2012/0300010 A1 | 11/2012 | Kawanabe et al. |
| 2013/0050739 A1* | 2/2013 | Oshima .................. G06F 3/1211 358/1.14 |
| 2013/0050754 A1* | 2/2013 | Wada ..................... G06Q 30/06 358/1.15 |
| 2013/0063536 A1 | 3/2013 | Komai et al. |
| 2013/0242318 A1 | 9/2013 | Yamaguchi et al. |
| 2014/0139607 A1 | 5/2014 | Hayashi et al. |
| 2015/0371126 A1* | 12/2015 | Ota ....................... G06K 15/408 358/1.14 |
| 2016/0246547 A1* | 8/2016 | Suzuki ................... G06F 3/121 |
| 2017/0264754 A1* | 9/2017 | Mano ................. H04N 1/00076 |
| 2017/0264782 A1 | 9/2017 | Hashimoto |
| 2017/0348872 A1 | 12/2017 | Suzuki et al. |
| 2018/0201027 A1 | 7/2018 | Suzuki et al. |
| 2018/0210389 A1* | 7/2018 | Konishi .................. G06F 3/121 |
| 2019/0034132 A1* | 1/2019 | Yamada ................ G06F 3/1234 |
| 2020/0079097 A1 | 3/2020 | Otsuka et al. |
| 2020/0081669 A1 | 3/2020 | Kunimi et al. |
| 2020/0167454 A1 | 5/2020 | Tanaka et al. |
| 2020/0233475 A1* | 7/2020 | Galbraith .................. G06F 9/52 |
| 2020/0278618 A1 | 9/2020 | Kanatani et al. |
| 2020/0336622 A1 | 10/2020 | Kunimi et al. |
| 2022/0066348 A1 | 3/2022 | Matsuno et al. |
| 2022/0283749 A1* | 9/2022 | Takabayashi ........... G06F 3/121 |
| 2023/0148080 A1 | 5/2023 | Sakurada et al. |

OTHER PUBLICATIONS

Chiba et al. (JP-3772585, Published Jun. 23, 2000) (Year: 2000).*
Watanabe et al. (JP-6066260, Published Dec. 5, 2013) (Year: 2013).*

* cited by examiner

FIG. 2
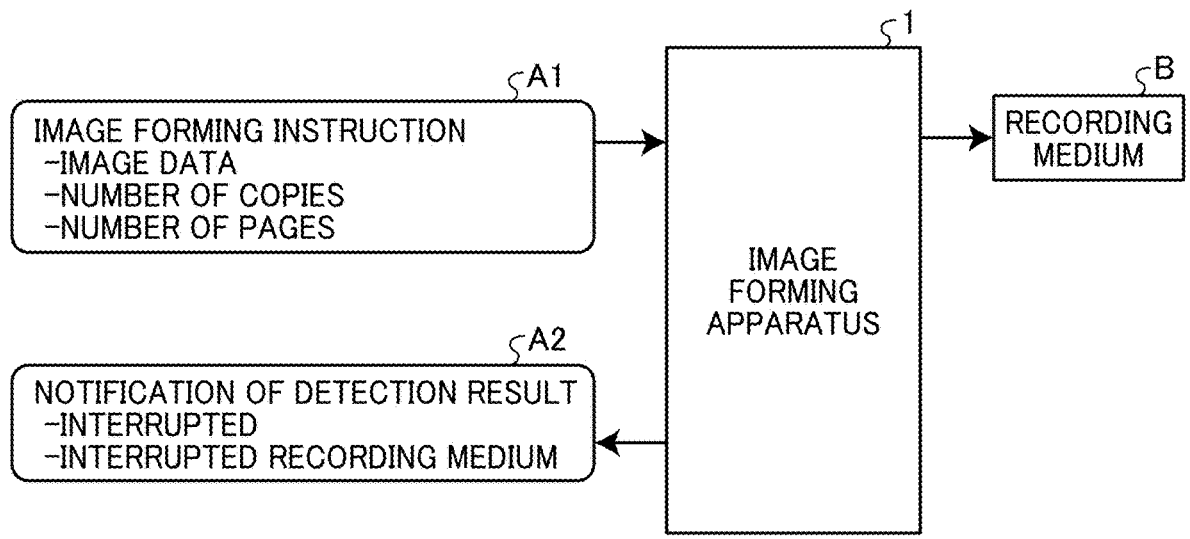
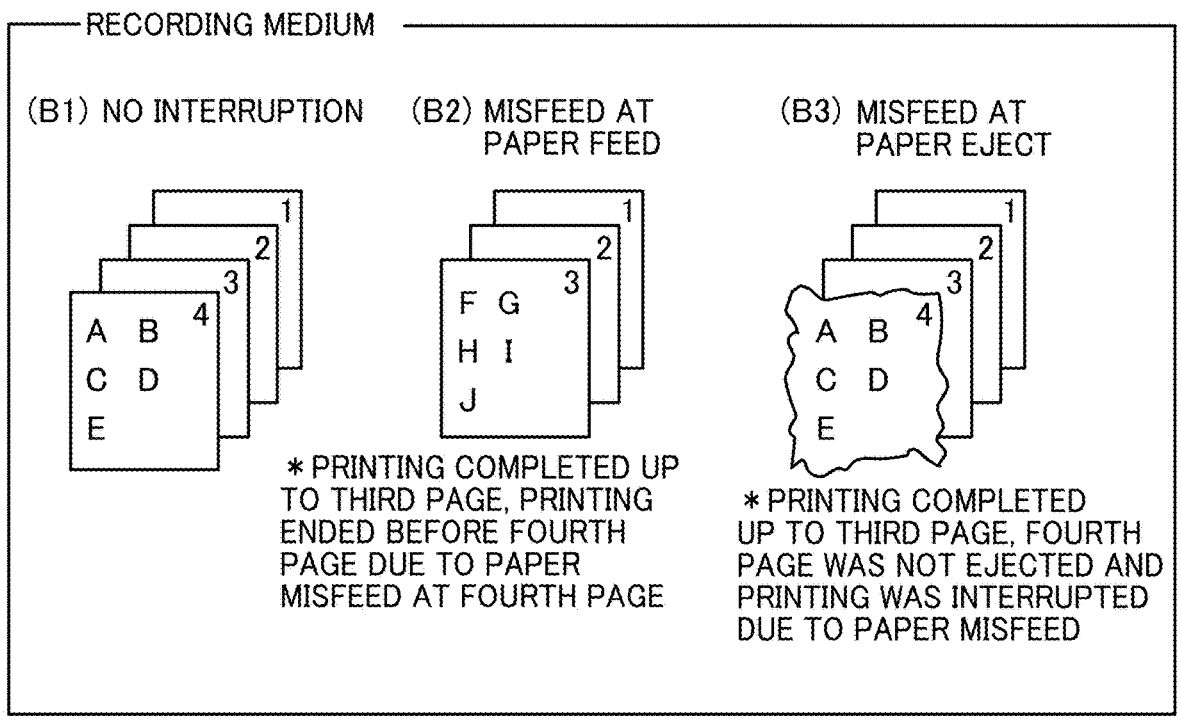

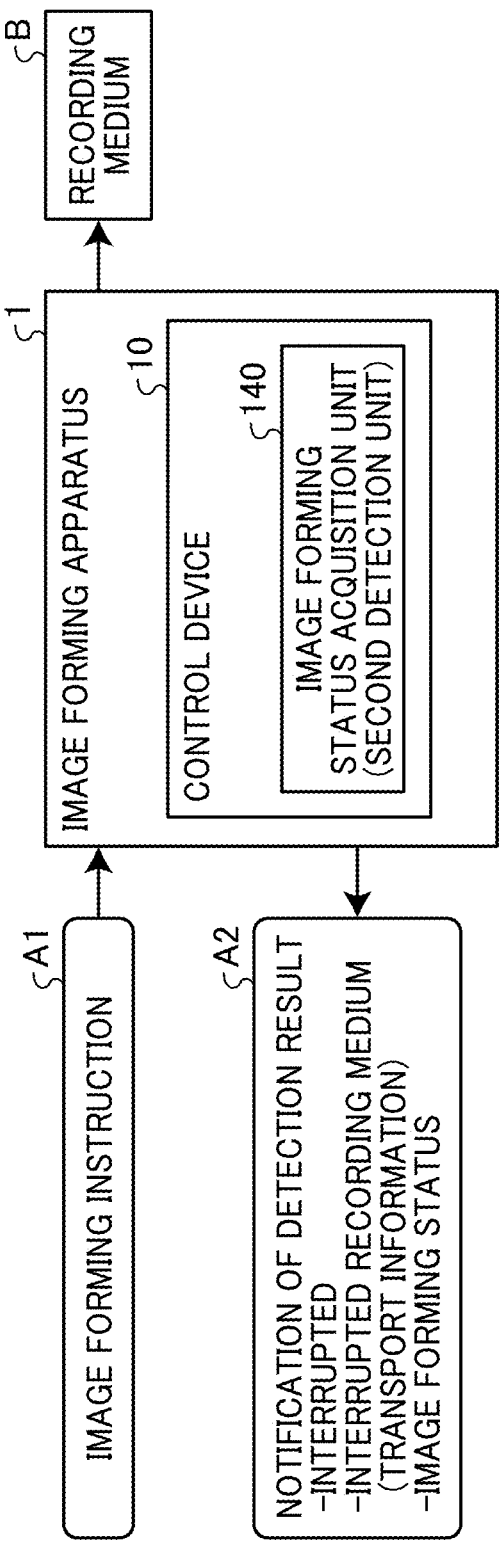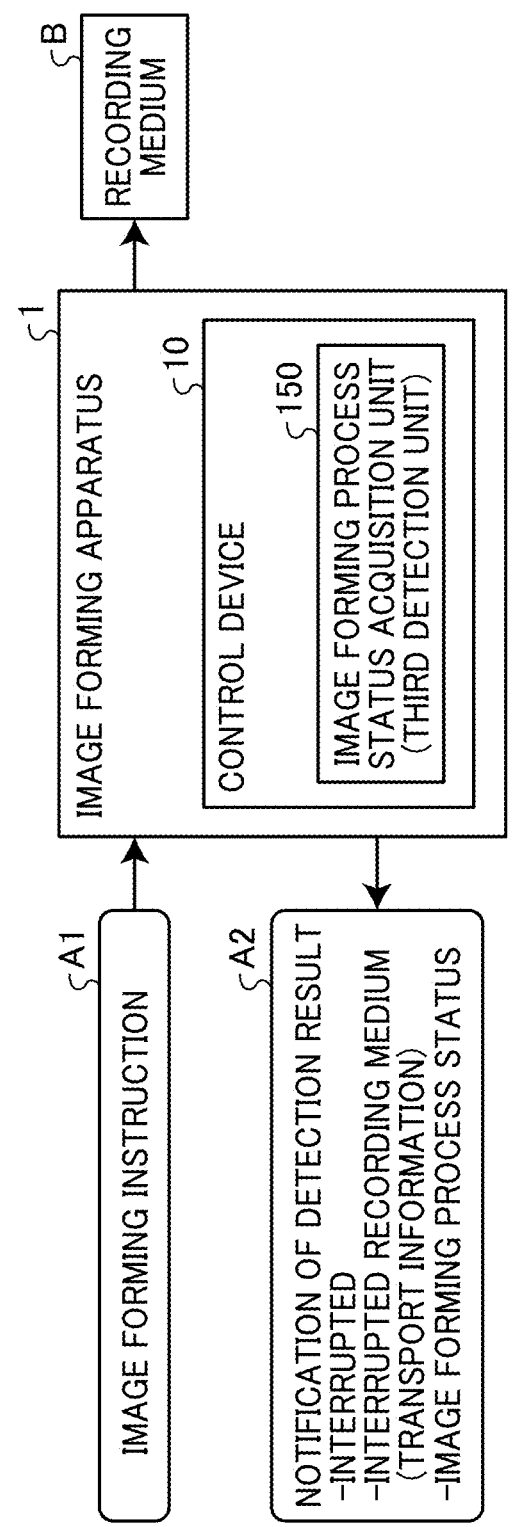

IMAGE FORMING APPARATUS, SYSTEM, AND METHOD FOR DETECTING MALFUNCTION

CROSS-REFERENCE TO RELATED APPLICATIONS

This patent application is based on and claims priority pursuant to 35 U.S.C. § 119(a) to Japanese Patent Application No. 2022-136792, filed on Aug. 30, 2022, in the Japan Patent Office, the entire disclosure of which is hereby incorporated by reference herein.

BACKGROUND

Technical Field

The present disclosure relates to an image forming apparatus, a system, and a method.

Background Art

A technology for managing printed matter printed by a printing device using an external device is disclosed. According to this technology, an identifier (ID) generated and added to the printed matter by the printing device at the time of printing is transmitted to the external device, and the printed matter is managed by the external device based on the ID.

Further, a method for detecting missing pages and erratic pages in an inspection of the printed matter is disclosed. According to the disclosed method, unique information for verification printed on the printed matter with an inspection device is read, and the number of copies or pages counted by the inspection device using a counter is compared with the number of copies or pages read from the unique information on the printed matter. In the case the values do not match, the external device is notified.

SUMMARY

Embodiments of the present disclosure describe an image forming apparatus, a system, and a method. According to one embodiment, the image forming apparatus includes an image forming engine to form an image on a recording medium, interrupts an image formation by the image forming engine in response to a malfunction, detects a recording medium on which the image formation is interrupted, and notifies an external device of a detection result of the recording medium.

According to one embodiment, the system forms an image on a recording medium, interrupts an image formation by the image forming engine in response to a malfunction, detects a recording medium on which the image formation is interrupted, transmits a notification to an external device indicating a detection result of the recording medium, and manages the recording medium using identification information indicated in the detection result.

According to one embodiment, the method for notifying an external device of information on an interrupted recording medium by an image forming apparatus includes controlling an image forming engine to form an image on a recording medium, interrupting an image formation by the image forming engine in response to a malfunction, detecting a recording medium on which the image formation is interrupted, and notifying the external device of a detection result of the recording medium.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 2 is a diagram illustrating an example of three patterns of operations of the image forming apparatus;

FIG. 7 is a block diagram illustrating an example of a configuration of the image forming apparatus according to a modified example 1;

FIG. 8 is a block diagram illustrating an example of a configuration of the image forming apparatus according to a modified example 2:

Figure 1:
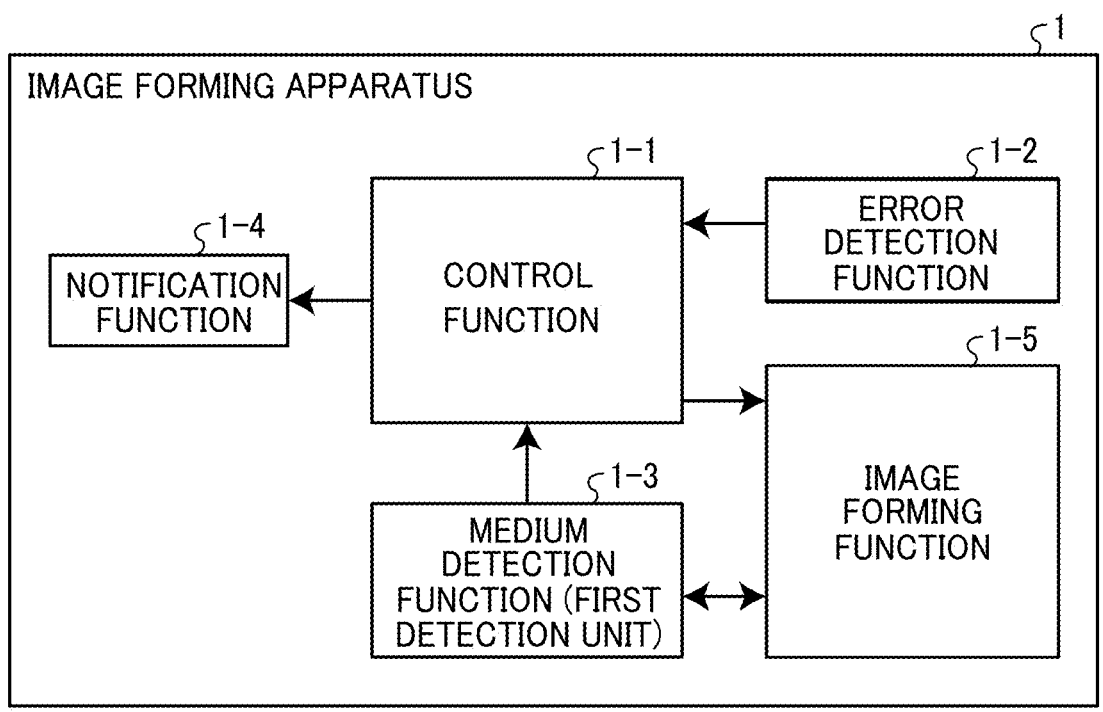
FIG. 1 is a block diagram illustrating an example of a configuration of an image forming apparatus according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of an image forming apparatus, a system, and a method are described in detail below with reference to the accompanying drawings. The image forming apparatus is a device that forms an image on a recording medium, such as a printing device. The term "printing" is sometimes used to facilitate intuitive understanding of forming an image on the recording medium. The recording medium is a medium on which information is recorded by forming an image, and an example is printing paper. The image includes, for example, characters, symbols, ruled lines, photographs, patterns, backgrounds, and the like.

FIG. 1 is a block diagram illustrating an example of a functional configuration of an image forming apparatus according to a first embodiment. As illustrated in FIG. 1, the image forming apparatus 1 includes a control function 1-1, an error detection function 1-2, a medium detection function 1-3, a notification function 1-4, and an image forming function 1-5. The medium detection function 1-3 corresponds to a "first detection unit".

The control function 1-1 controls the image forming function 1-5 to execute an image forming process. The error detection function 1-2 detects an error that causes interruption of the image forming process. For example, the error detection function 1-2 detects an error corresponding to a malfunction such as a paper jam in the image forming apparatus 1, running out of a recording medium, transport error, or an open status of an opening or closing part such as a door of the image forming apparatus 1. The medium detection function 1-3 detects the recording medium inside the image forming function 1-5. The notification function 1-4 notifies an external device of the image forming apparatus 1 of the detection result of the recording medium. While the external device may be any device external to the image forming apparatus, it is an example of extraneous resource that includes, for example, a user who can receive any information output from the image forming apparatus.

According to the configuration of these functions, in response to a detection of the error that interrupts the image forming process by the error detection function 1-2, the control function 1-1 interrupts the image forming process being performed by the image forming function 1-5, and the medium detection function 1-3 detects the recording medium on which image forming has been interrupted, and the notification function 1-4 notifies the external device of the detection result. The detection result is information indicating that there was an interruption (also referred to as "interruption information") and information identifying an interrupted recording medium.

A process for the recording medium on which the image is formed by the image forming apparatus 1 is notified to the external device is described in the following by dividing into three patterns as an example.

FIG. 2 is a diagram illustrating an example of three patterns of operations of the image forming apparatus. The image forming apparatus 1 illustrated in FIG. 2 receives an image forming instruction A1, executes an image forming process based on the settings of the image data, the number of copies, and the number of pages included in the image forming instruction A1, forms an image, and ejects the recording medium B. A case where the image forming apparatus 1 feeds recording media one by one and sequentially forms images of the first to fourth pages on the first to fourth recording media is described as an example.

A first pattern is the case where the image forming process is not interrupted (B1). Since the image forming process is not interrupted, images of first to fourth pages are sequentially formed on first to fourth recording media, and the first to fourth recording media B are sequentially ejected from the image forming apparatus 1 one by one. In the first pattern, all the recording media B on which the images have been formed by the image forming apparatus 1 are ejected normally. In the first pattern, the recording media on which the images are formed can be managed by the external device with a conventional method.

A second pattern is a case where the image forming process is interrupted in the middle of the image forming process before the processing on one of the recording media is started. For example, an error occurred when the fourth sheet is fed after the third sheet has been processed and ejected (B2). Since the interruption occurred before the processing of the fourth page was started, the image of the fourth page is formed on the recording medium fed after recovery from the interruption. The interruption occurred before the start of processing does not have to be notified to the external device. In the second pattern, the recording medium on which the image is formed can be managed by the conventional method on the external device.

A third pattern is a case where the mage forming process is interrupted after the processing on the recording medium is started (B3). For example, an error such as a transport failure occurred in the fourth recording medium after the start of processing of the fourth page but before the fourth page is ejected. Since the image of the fourth page is formed on the fourth recording medium, the fourth recording medium is subject to management. However, in the conventional method, the external device is unable to detect the interruption in the processing of the fourth page, the status of the recording medium of the fourth page, such as the recording medium of the fourth page being collected from the image forming apparatus 1, and the like. In the image forming apparatus 1 according to the first embodiment, since the detection result A2 of the interrupted recording medium is notified to the external device, the recording medium on which the image formation has started can be obtained from the external device even in the case the image forming apparatus 1 is interrupted.

The configuration of the image forming apparatus 1 is described in detail.

Figure 3:
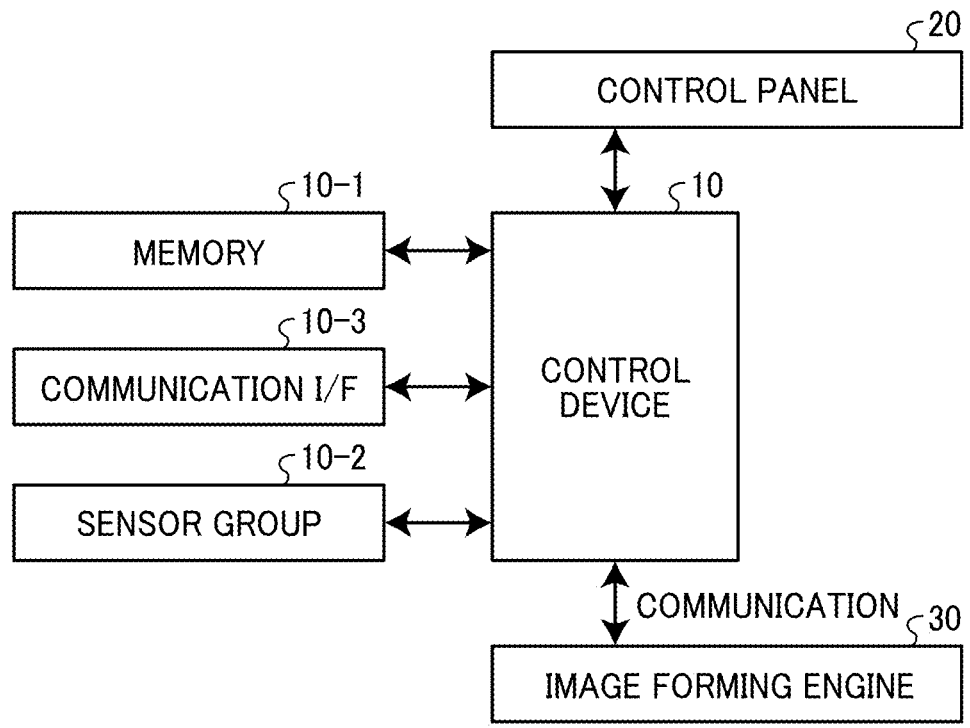
FIG. 3 is a block diagram illustrating an example of a hardware configuration of a control circuit of the image forming apparatus.
Figure 4:
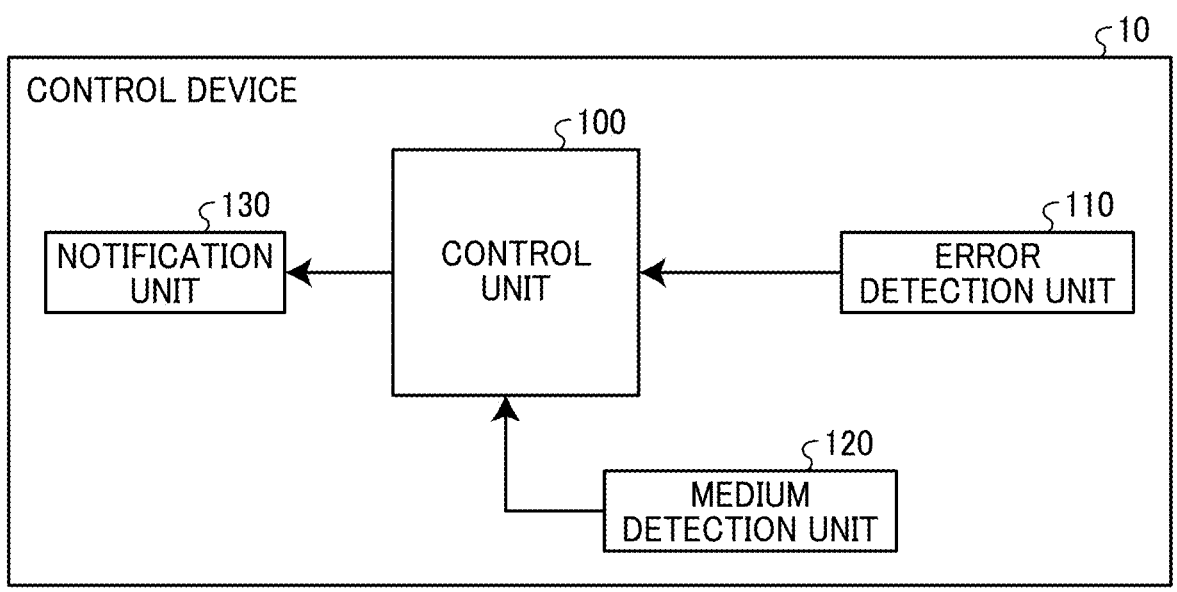
FIG. 4 is a block diagram illustrating an example of a functional configuration of the image forming apparatus.
Figure 5:
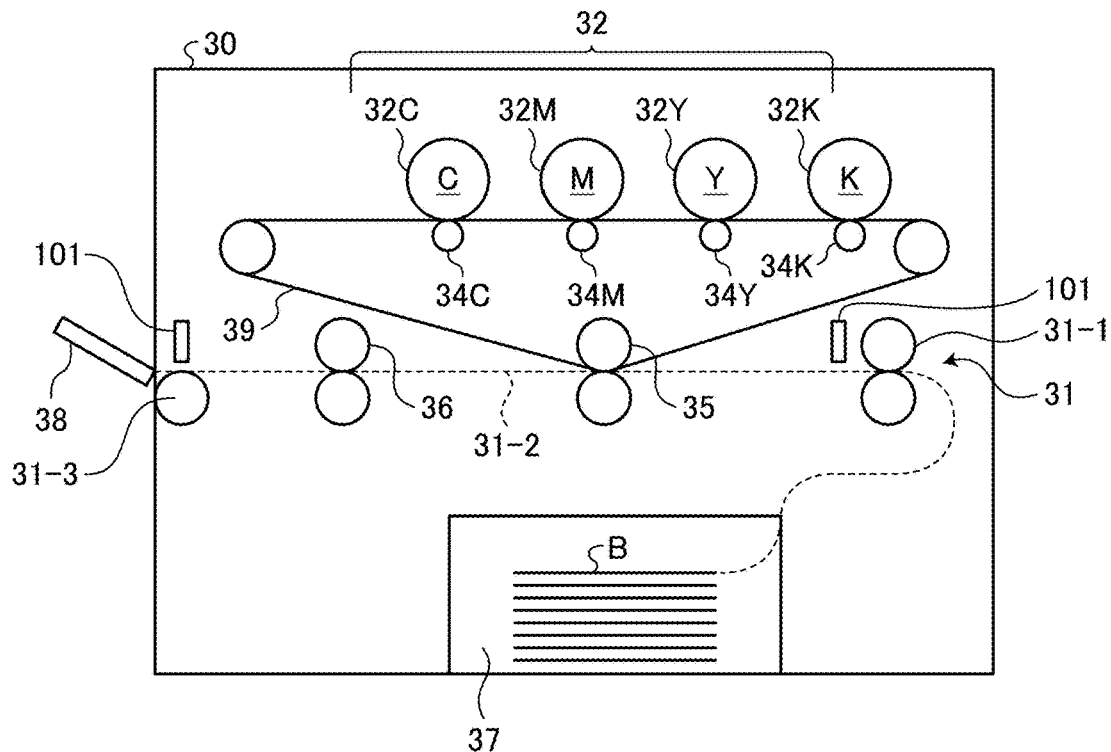
FIG. 5 is a diagram illustrating an example of a configuration of an image forming engine of the image forming apparatus.

FIG. 3 is a block diagram illustrating an example of a hardware configuration of control circuitry of the image forming apparatus 1. FIG. 4 is a block diagram illustrating an example of a functional configuration of a control device of the image forming apparatus 1. FIG. 5 is a diagram illustrating an example of a configuration of an image forming engine 30 of the image forming apparatus 1.

As illustrated in FIG. 3, a control device 10 controls functions of the image forming apparatus 1. A memory 10-1 is a flash memory or the like. A sensor group 10-2 is a group of various sensors for detecting the status and malfunction of the image forming apparatus 1. A communication interface (I/F) 10-3 is an interface for communicating with the external device, such as a network interface circuit.

As illustrated in FIG. 4, the control device 10 includes functions such as a control unit 100, an error detection unit 110, a medium detection unit 120, a notification unit 130, and the like. The control device 10 is implemented by, for example, a central processing unit (CPU) and a read only memory (ROM), and the CPU implements each function by executing various programs in a storage unit such as the ROM. The control device 10 may implement some or all of the functions by dedicated hardware such as an application specific integrated circuit (ASIC).

In response to an output instruction received from the control panel 20 or the like, the control device 10 communicates with the image forming engine 30 to start the image forming process. The output instruction corresponds to an image forming instruction A1.

FIG. 5 illustrates a configuration of the image forming engine 30 implemented by an electrophotographic method as an example. The image forming method performed by the image forming engine 30 is not limited to the electrophotographic method. The image forming method performed by the image forming engine 30 may be other method such as an ink jet method.

Coloring materials such as toner and ink include materials that adhere and fix to the recording medium B. and materials that adhere and permeate the recording medium B. The recording medium B is, for example, paper, recording paper, film, cloth, etc. and unless otherwise specified, all materials to which coloring materials adhere are included.

The material of the recording medium B may be any material as long as the coloring materials adhere even temporarily, including paper, thread, fiber, cloth, leather, metal, plastic, glass, wood, ceramics, and the like.

The image forming engine 30 illustrated in FIG. 5 includes an image forming unit 32 and a paper feed unit 37. The image forming unit 32 typically includes image forming units 32C, 32M, 32Y, and 32K (each being a roller) and primary transfer units 34C, 34M, 34Y, and 34K (each being a roller), of four-colors, which are cyan, magenta, yellow, and black (CMYK), a secondary transfer unit 35, a fixing unit 36, an ejection tray 38, and the like. The image forming unit 32 further includes a transport unit 31 that feeds and transports the recording medium B from the paper feed unit 37. As the transport unit 31, a paper feed roller 31-1 for feeding the recording medium B from the paper feed unit 37, a transport path 31-2, and an eject roller 31-3 are illustrated. The paper feed roller 31-1, the eject roller 31-3, the number of rollers installed, and the route of the transport path 31-2 are examples, and may be modified as appropriate.

Each of the image forming units 32C, 32M, 32Y, and 32K performs an image forming process based on writing information of each color written by an optical writing device based on the image data, and forms a toner image of each color CMYK. Each toner image formed by each of the image forming units 32C, 32M, 32Y and 32K is transferred to an endless intermediate transfer belt 39 by each of the primary transfer units 34C, 34M, 34Y and 34K.

In secondary transfer, each toner image transferred to the intermediate transfer belt 39 is transferred by the secondary transfer unit 35, as the intermediate transfer belt 39 rotates, onto the recording medium B fed from the paper feed unit 37. A full-color image is formed on the recording medium B by the secondary transfer, the recording medium B is transported to the fixing unit 36, the image is fixed on the recording medium B by the fixing unit 36, and the recording medium B is ejected from the image forming engine 30 to the ejection tray 38.

A sensor 101 for detecting the recording medium B is disposed at each of locations in vicinity of the paper feed roller 31-1 and the eject roller 31-3. The sensor 101 may be any sensor capable of detecting the recording medium B. For example, the sensor 101 is an infrared sensor. The sensor 101 may also be provided at any other location.

Further, an existing sensor output may be used to detect the recording medium B. For example, in the case of a general printing device, output of a paper position detection sensor installed near the paper feed tray and the output of a paper amount detection sensor installed in the paper feed tray may be used for detection at the paper feed position. For detection at the eject position, output from the paper position detection sensor provided near the paper eject port or the paper amount detection sensor provided on the ejection tray may be used.

The error detection unit 110 detects an error that causes interruption of the image forming process based on the malfunction notified from the one or more units of the image forming apparatus 1. For example, in response to a notification of a paper jam during paper feeding, the error detection unit 110 detects the paper jam as a paper feed error that causes interruption of the image forming process. Further, in response to the notification of a transport failure in the image forming process after paper feeding, the error detection unit 110 detects the malfunction as a transport error that causes interruption of the image forming process.

The medium detection unit 120 detects that the recording medium B has been fed according to the output of the sensor 101 at the paper feed roller 31-1, and that the recording medium B is ejected from the image forming apparatus 1 according to the output of the sensor 101 at the eject roller 31-3. In response to a detection of the feeding of the recording medium B, the medium detection unit 120 monitors the transport status using the identification information of the recording medium B. For example, the medium detection unit 120 monitors the transport status of the recording medium B by storing the page number, the identification information of the image, and the transportation information indicating the transport status in the memory 10-1 in association, detecting the position of the recording medium B on the transport path at any time with the sensor 101 or the like, and updating the transport information in the memory 10-1.

For example, an error may occur by the recording medium B tangled after being fed, and not ejected from the image forming apparatus 1. In this case, the operator of the image forming apparatus 1 may open the opening/closing portion and manually remove the recording medium B from inside of the image forming apparatus 1 in order to clear the error. The medium detection unit 120 holds the identification information of the recording medium B that has not been ejected from the image forming apparatus 1 in the memory 10-1. Whether the ejection of the recording medium B is incomplete or not is determined by the output obtained from the sensor 101 at the eject roller 31-3 when the recording medium B is ejected, and the position of the transport information is updated for the ejected recording medium B. The recording medium B for which the position of the transport information is not updated is a recording medium that is not ejected.

The determination as to whether the ejection is incomplete is not limited to the output from the sensor 101 at the eject roller 31-3, and sensor output from any other location may be used as long as the completion of ejection can be confirmed.

Based on the information acquired by the medium detection unit 120, the control device 10 detects the recording medium B interrupted due to an error, and notifies the external device of the detection result through the notification unit 130. The notification unit 130 notifies the external device of the detection result of the recording medium B through the communication I/F 10-3 based on the instruction from the control device 10.

The detection result includes interruption information, transportation information of the recording medium B, and the like. The transportation information of the recording medium B includes identification information that identifies the recording medium B and information indicating the transport status of the recording medium B at the time of interruption. The information indicating the transport status is based on the information on the start of paper feeding and the information on the completion of ejection.

The control device 10 may not notify the external device of the detection result when the interruption occurs. For example, in the case the error is a paper feed error, the recording medium B for which processing has started is not present in the image forming apparatus 1 before the processing for the recording medium B is started. Therefore, the control device 10 may determine whether to notify the external device based on the cause of the error that has occurred, so that the notification is not performed in the case of the paper feed error.

In addition, the control device 10 may predict the processing status of the recording medium B that is not ejected based on time elapsed from the start of feeding of recording medium B to the interruption of transport due to the error, a transport speed of the recording medium B by the transport unit 31, size of the recording medium B, a total length of the transport path 31-2, and may notify the detection result including a predicted result. The status of the incompletely ejected recording medium B varies depending on whether the image is being formed or after the image has been fixed, timing of the error, the configuration of the image forming engine 30, and the like. By predicting by calculation as described above, the external device is able to obtain information on how much processing has been performed on the recording medium B.

The image forming engine 30 may apply the ink jet method. In the case of the ink jet method, the image is formed on the recording medium B by discharging four colors of CMYK ink from ink heads. The recording medium B is fed from the paper feed unit, transported in the transport direction, an image is formed in the image forming unit, and ejected by the eject roller. The ink head discharges ink at an image forming position on the recording medium B to form the image. The ink head may perform line scanning on the recording medium B in the main scanning direction perpendicular to the transport direction. The detection and notification of the transport information of the recording medium B at the time of interruption is also possible in the case of the ink jet method.

Figure 6:
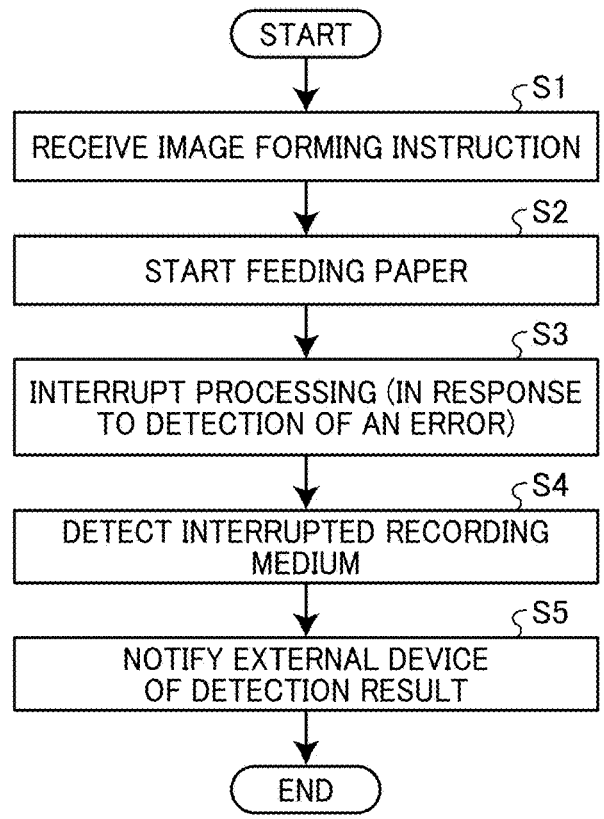
FIG. 6 is a flowchart illustrating an example of an external notification process in a case processing of the image forming apparatus is interrupted.

FIG. 6 is a flowchart illustrating an example of an external notification operation in a case processing of the image forming apparatus 1 is interrupted. In step S1, the control device 10 receives an image forming instruction from the control panel 20.

In step S2, the control device 10 instructs the paper feed unit 37 to start paper feeding, and further instructs the image forming unit 32 to form an image.

In step S3, in response to a detection by the error detection unit 110 of an error that involves interruption of the image forming process, the control device 10 interrupts the process.

In step S4, the control device 10 detects the interrupted recording medium B in the image forming apparatus 1.

In step S5, the control device 10 notifies the external device of the detection result, for example, the recording medium that has not been ejected from the image forming apparatus 1 after being fed.

After step S3, the control device 10 determines whether the error is an error after paper feeding, and in the case of an error after paper feeding, the processing from step S4 is performed, and in the case of an error before paper feeding, the process may be terminated without notification. The error before paper feeding is, for example, a paper feeding error. An example of determining whether the error is the error before paper feeding or the error after paper feeding is described, but the present disclosure is not limited to such example. The determination may be made for each error factor.

Further, the control device 10 may not notify the external device in the case the recording medium B that has not been ejected from the image forming apparatus 1 after being fed is not detected, that is, in the case the recording medium B that has not been ejected does not exist.

In addition, the error detection unit 110 may notify the control device 10 of the cause of the error in addition to the error to interrupt the image forming process, and in the case the cause of the error is the transport error of the recording medium B, the control device 10 may include the cause of the error in the transport information of the recording medium B and notify the external device.

Also, the recording medium B, which has been ejected without any interruption after the start of processing, can be managed by an external device according to the conventional technology. For example, the image forming apparatus 1 transmits an ID generated during image formation to the external device, and the ID is added to the recording medium B by the image forming apparatus 1. The detailed description of the conventional technology is omitted.

As described above, the image forming apparatus 1 according to the first embodiment notifies the external device of the transport information of the recording medium B in the case the image formation is interrupted. Accordingly, the external device is able to obtain information on the interrupted recording medium. Further, by detecting whether the recording medium is ejected by the eject roller of the image forming apparatus 1, the recording medium removed from the image forming engine at the time of interruption can be identified and managed with the external device.

In the first embodiment, in response to the interruption of the image forming apparatus 1 due to the error, the transport information of the recording medium B is notified to the external device. A modified example 1 is an example in which the image forming apparatus 1 further notifies the external device of information indicating the image forming status of the recording medium B. In the following, configurations different from those of the first embodiment are described, and illustration and description of configurations similar to those of the first embodiment are omitted as appropriate.

FIG. 7 is a block diagram illustrating an example of a configuration of the image forming apparatus 1 according to the modified example 1. The image forming apparatus 1 further includes an image forming status acquisition unit 140 in the functional block configuration of the control device 10. The image forming status acquisition unit 140 corresponds to a "second detection unit". According to this configuration, the control device 10 acquires and notifies the external device, in addition to information about the interrupted recording medium B, information indicating the image forming status for each recording medium.

In the case the image forming engine 30 applies the electrophotographic method, the image forming status refers to a degree of completion of transferring the toner image for one sheet of the recording medium performed by the image forming unit 32 onto the recording medium B. The control device 10 determines the image forming status from relative positional relationship of the recording medium B with respect to the secondary transfer unit 35 and an image area size of the recording medium B, for example, using the image forming status acquisition unit 140. In the case the image area of the recording medium B has completely passed the position of the secondary transfer unit 35 in the transport direction, the image forming status is 100% complete, and in the case a half of the image area has passed, the image forming status can be determined according to the degree of completion, such as 50% completion.

Further, in the case the image forming engine 30 applies the ink jet method, the degree of completion of the image for one sheet of recording medium B refers to the degree of completion of the image for one recording medium on which the image is formed on the recording medium B with ink.

In the case the image formation is performed on both sides of the recording medium B, the control device 10 acquires and notifies the image forming status of the front side and the back side.

Since the image forming apparatus 1 notifies the external device of the image forming status, the external device is able to obtain the image forming status of the recording medium B left in the image forming apparatus 1 due to the interruption, and based on the information, the recording medium can be managed by the external device.

A modified example 2 is an example in which the image forming apparatus 1 notifies the external device of information indicating the image forming process of the recording medium in addition to the transport information of the recording medium.

FIG. 8 is a block diagram illustrating an example of a configuration of the image forming apparatus 1 according to the modified example 2. The image forming apparatus 1 further includes an image forming process status acquisition unit 150 as illustrated in the functional block configuration of the control device 10. The image forming process status acquisition unit 150 corresponds to a "third detection unit". According to this configuration, the control device 10 acquires in addition to the information about the interrupted recording medium, the image forming process status indicating the processing status of the image forming process for each recording medium.

For example, the image forming process includes a transfer process for transferring the image onto the recording medium and a fixing process for fixing the transferred image onto the recording medium.

The control device 10 uses the image forming process status acquisition unit 150 to acquire the detection signal of the recording medium B from each unit, thereby detecting how far the image forming process has been completed.

Since the image forming apparatus 1 notifies the external device of the status of the image forming process, the external device is able to obtain the status of the image forming process of the recording medium B left in the image forming apparatus 1 due to the interruption, and based on such information, the recording medium can be managed by the external device.

In response to a power shutdown of the image forming apparatus 1 at an unintended timing such as a blackout, the image forming process being executed is forcibly interrupted. In a modified example 3, the configuration of the image forming apparatus 1 capable of notifying the external device of the interrupted recording medium even in such a case is described.

Figure 9:
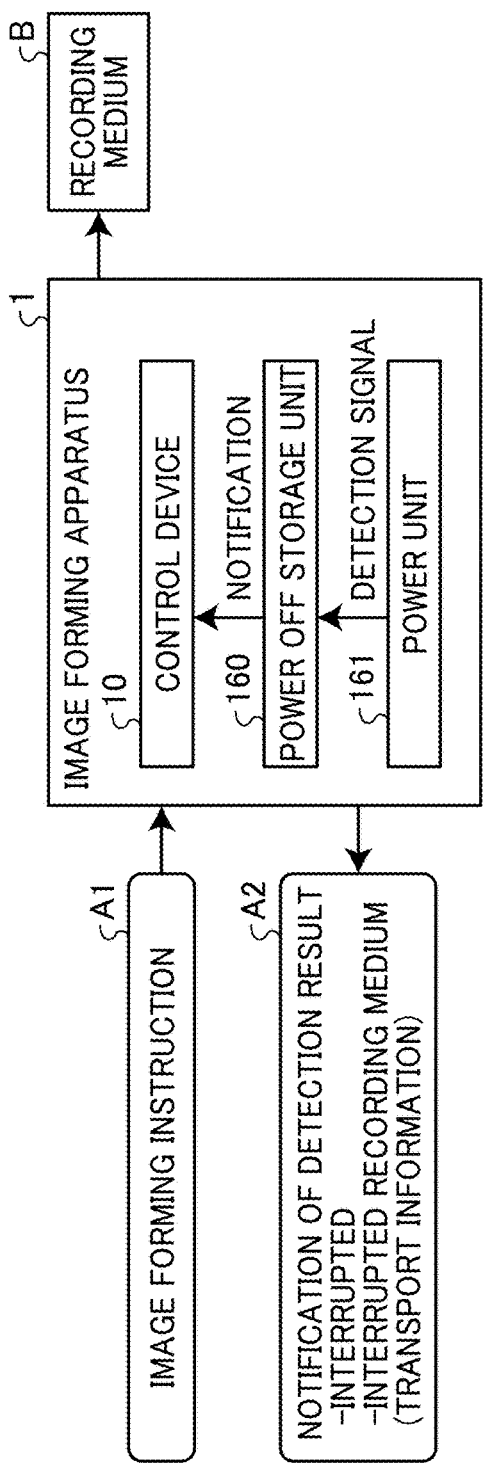
FIG. 9 is a block diagram illustrating an example of a configuration of the image forming apparatus according to a modified example 3.

FIG. 9 is a block diagram illustrating an example of a configuration of the image forming apparatus 1 according to the modified example 3. As illustrated in FIG. 9, the image forming apparatus 1 further includes a power off storage unit 160 that stores information on the power shutdown at unintended timings. The power off storage unit 160 is implemented by a CPU that operates in cooperation with a memory, for example.

The power off storage unit 160 detects that the power is turned off at the unintended timing, for example, from a detection signal from a power unit 161, and stores power off information indicating an unintended power off. The power unit 161 is a power source, such as a battery.

In addition, the power off storage unit 160 notifies the control device 10 of the power off information indicating that there was an unintended power off in response to the power turned on again.

In response to receiving the notification of the power off information from the power off storage unit 160 when the power is turned on again, the control device 10 detects the recording medium B interrupted by unintentional power off before power is turned on again, and notifies the detection result to the external device. The interruption of the recording medium B by turning off the power is detected in the same way as the recording medium interrupted by the error from the transport information of the recording medium stored in the memory 10-1 by the medium detection unit 120. Further description is omitted to prevent a repetitive description.

As described above, the external device is able to obtain information on the recording medium B that has been interrupted due to the power being cut off at the unintended timing, and the external device is able to manage such recording medium.

The image forming apparatus 1 automatically performs a process of re-forming the image on another recording medium for which image forming on the recording medium was interrupted (referred to as a re-output) in the process started after interruption, based on determination based on the cause of the error. For example, reprinting automatically performed by the printing device corresponds to a re-output process. In a modified example 4, a configuration for notifying the external device that the interrupted recording medium B is re-output to another recording medium B in the image forming apparatus 1, is described.

Figure 10:
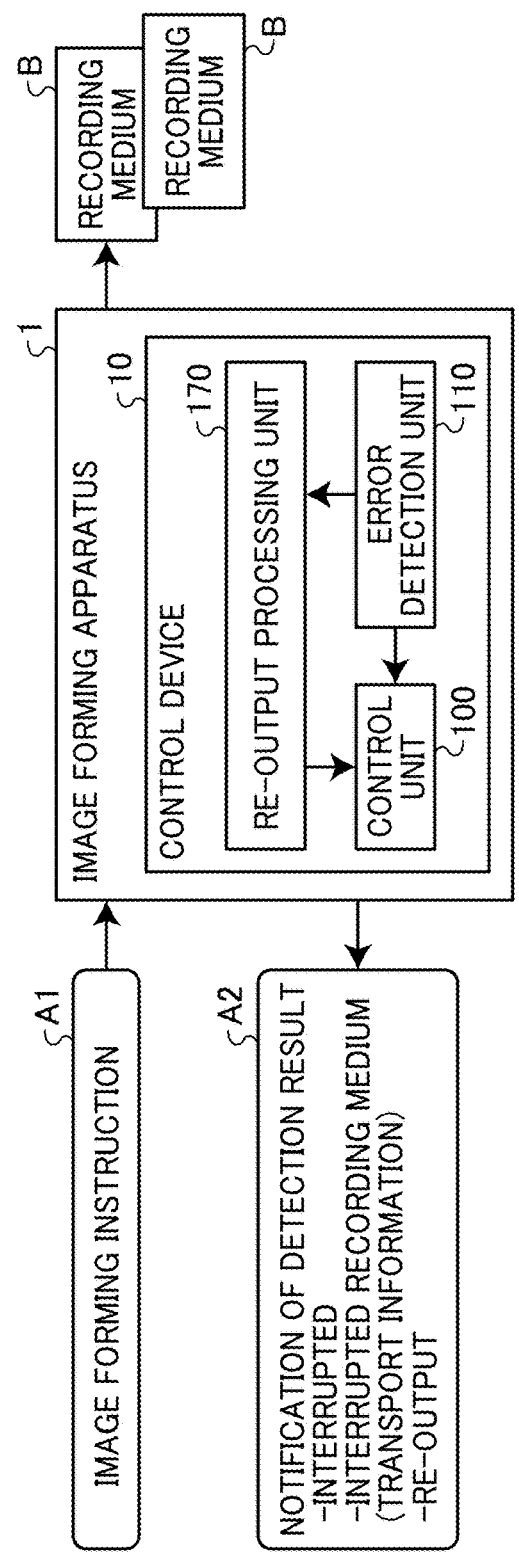
FIG. 10 is a block diagram illustrating an example of a configuration of the image forming apparatus according to a modified example 4.

FIG. 10 is a block diagram illustrating an example of a configuration of the image forming apparatus 1 according to the modified example 4. As illustrated in FIG. 10, the image forming apparatus 1 further includes a re-output processing unit 170.

The re-output processing unit 170 determines whether to re-output the interrupted page, and instructs the control unit 100 to re-output the page determined to be re-output. As an example, the re-output processing unit 170 determines whether to re-output the interrupted page based on the cause of the error notified from the error detection unit 110.

In response to the re-output instruction from the re-output processing unit 170, the control unit 100 performs re-output processing of the image after error recovery, notifies the external device of the recording medium interrupted due to the error and information that the re-output to another recording medium is performed.

A general image forming apparatus includes a storage unit that stores an image forming instruction received from the external device, and there are cases where the user intentionally refers to the storage unit to perform re-output. The re-output performed by the user may be detected by the control unit 100 and notified to the external device. By doing so, even when the user executes the re-output, the notification to the external device of the recording medium interrupted due to the error and the information that the re-output was performed to a different recording medium can be performed.

For example, an image forming instruction is given for 30 pages, one page for each sheet of recording medium, and suppose that an error occurred on the fourth page due to a paper jam during the process, and the fourth page is re-output. In the conventional technology, information indicating the jamming of the fourth page and that there are two sheets of the fourth page including the jammed recording medium and the re-outputted recording medium are not obtained.

Figure 11:
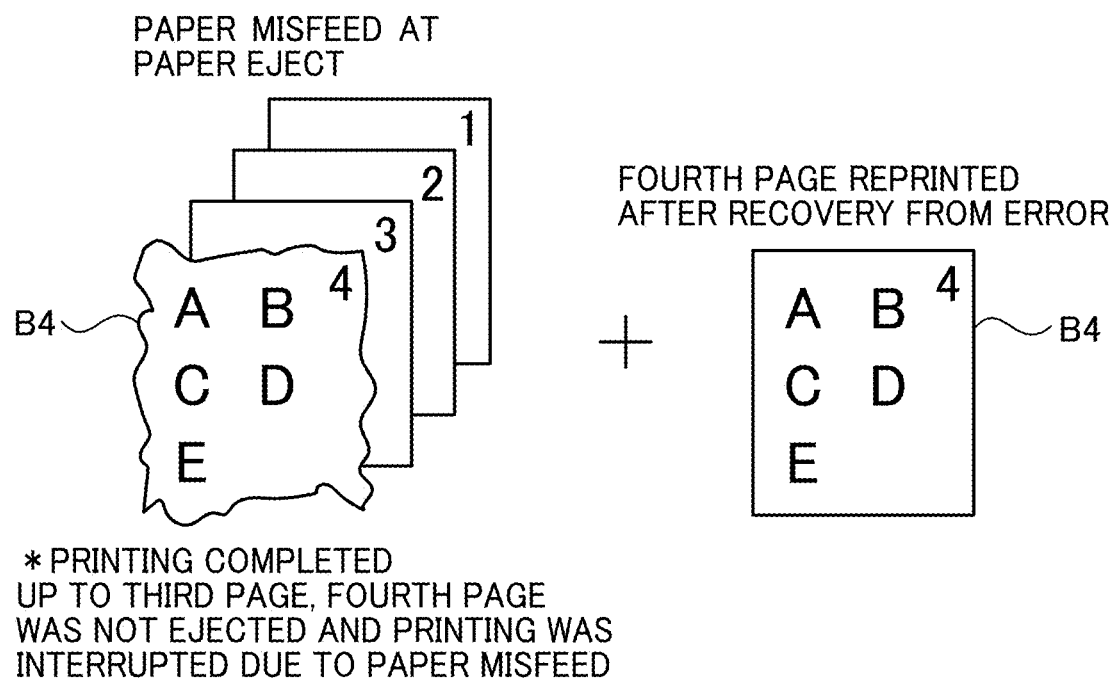
FIG. 11 is a diagram illustrating management of a re-output recording medium in an image forming apparatus according to the modified example 4.

FIG. 11 is a diagram illustrating management of the re-output recording medium of the image forming apparatus 1 according to the modified example 4. FIG. 11 illustrates a case where the fourth page B4 is jammed, the re-output is performed, and two fourth pages B4 exist. According to the image forming apparatus 1 of the modified example 4, the interrupted information for the first sheet and the re-output information for the second sheet are notified to the external device, so the external device is able to manage the interruption and re-output.

In the above embodiments, the image forming apparatus 1 notifies the external device of the detection result through the communication I/F 10-3. The notification from the image forming apparatus 1 to the external device may be performed through a channel other than the communication I/F 10-3. A modified example 5 describes an example in which the image forming apparatus 1 notifies the external device of the detection result by outputting the detection result on the recording medium.

Figure 12:
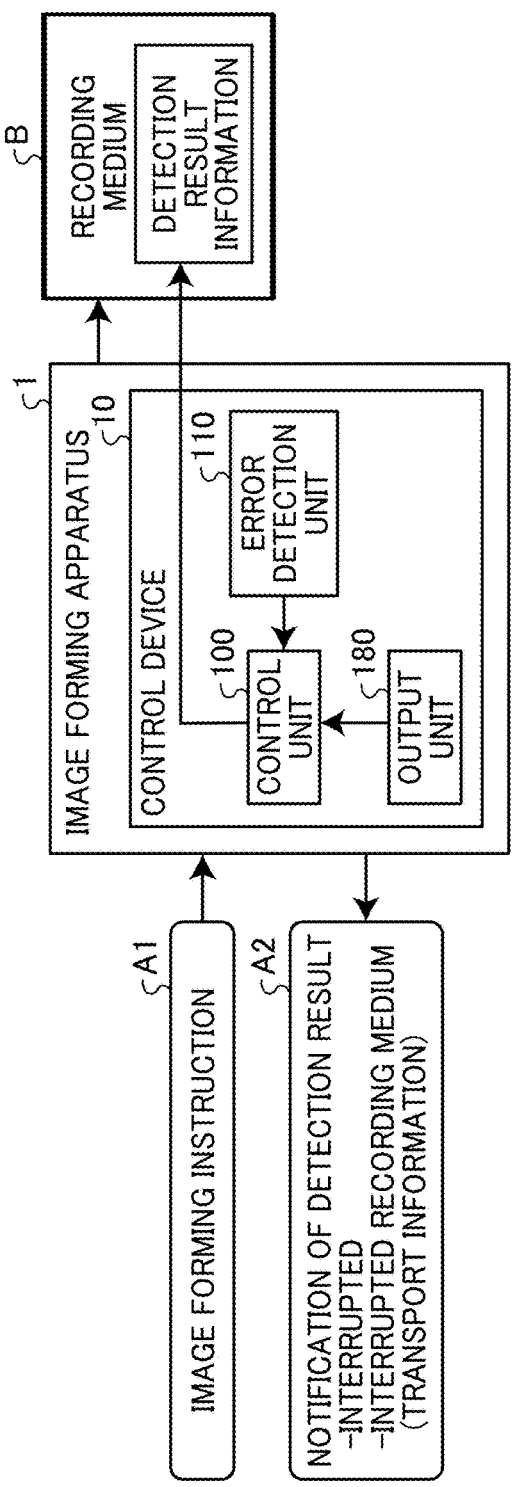
FIG. 12 is a block diagram illustrating an example of a configuration of the image forming apparatus according to a modified example 5.

FIG. 12 is a block diagram illustrating an example of a configuration of the image forming apparatus according to the modified example 5. As illustrated in FIG. 12, the image forming apparatus 1 according to the modified example 5 further includes an output unit 180 that issues an output instruction to output the detection result on the recording medium B.

In response to the instruction from the output unit 180, the control device 10 outputs the detection result to be notified to the external device on the recording medium B by the image forming engine 30. In other words, the detection result information is printed on the recording medium B. The image forming apparatus 1 prints the detection result information, and notifies the external device of the detection result information using the recording medium on which the detection result information is printed.

As described above, in the image forming apparatus of the modified example 5, notification of the detection result by the recording medium is possible. Since the image forming apparatus of the modified example 5 performs the notification using the recording medium, in the case the image forming apparatus does not include a communication I/F for transmitting data to the external device, or in the case there is no communication environment, the notification to the external device is possible.

In the case the notification by the recording medium and the notification by data are used together, even in the case one notification is not available for some reason, the notification is compensated by another notification method.

A modified example 6 is an example in which the recording medium B is used to notify the re-output.

Figure 13:
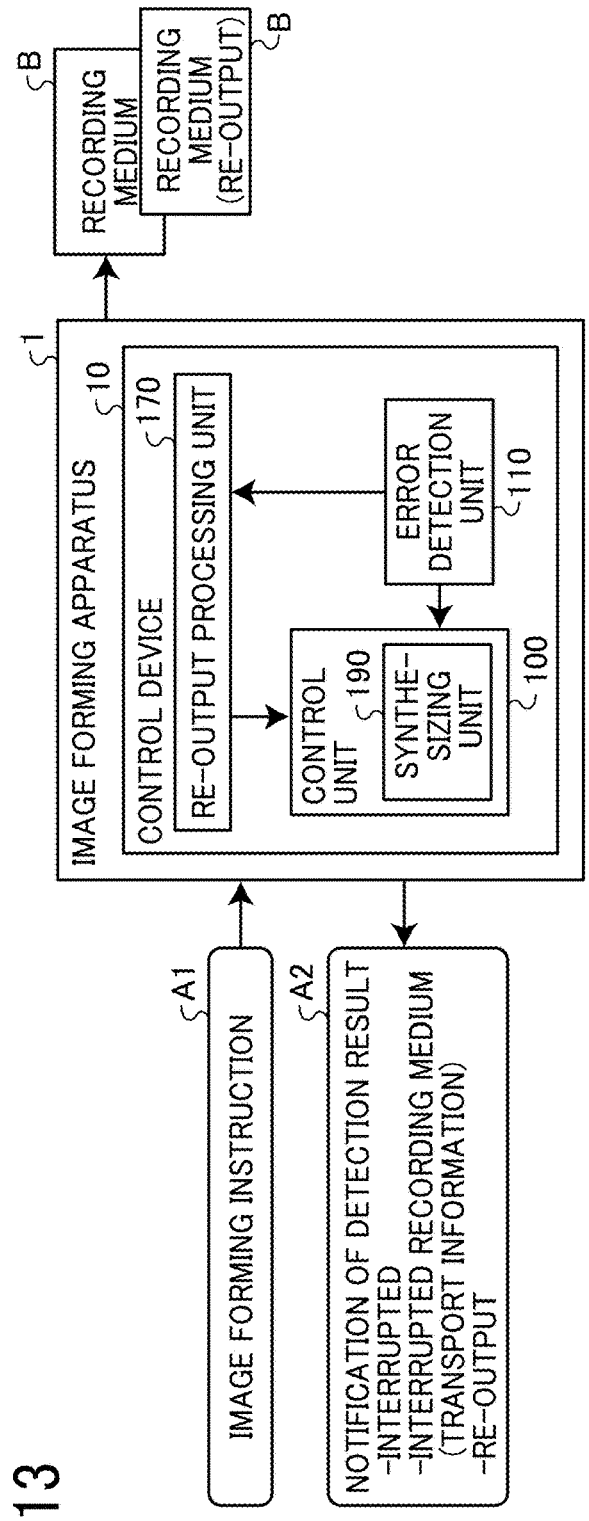
FIG. 13 is a block diagram illustrating an example of a configuration of the image forming apparatus according to a modified example 6.

FIG. 13 is a block diagram illustrating an example of a configuration of the image forming apparatus according to the modified example 6. As illustrated in FIG. 13, the image forming apparatus 1 according to the modified example 6 further includes a re-output processing unit 170 and a synthesizing unit 190.

In the control device 10, the re-output processing unit 170 instructs the control unit 100 to re-output based on determination that the re-output is to be performed. In response to receiving the instruction of re-output, the synthesizing unit 190 synthesizes information indicating re-output with the image data to be re-output. Then, the image forming engine 30 forms the image again on another recording medium based on synthesized image data.

Figure 14:
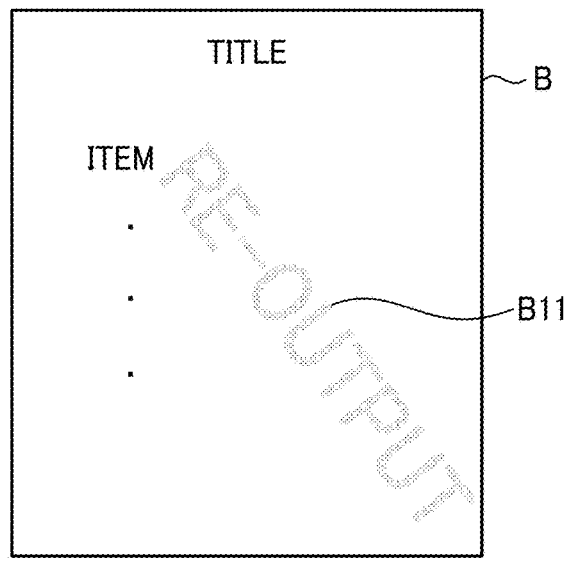
FIG. 14 is a diagram illustrating an example of an output of a reprinted recording medium.

FIG. 14 is a diagram illustrating an example of a reprinted recording medium. As illustrated in FIG. 14, the reprinted pages of a document are printed on the recording medium B. FIG. 14 illustrates a title and an item as an example. Further, on the recording medium B, identification information B11 indicating that the document is reprinted is printed with a visible recording material in color such as CMYK so that the identification information B11 can be confirmed under visible light.

In FIG. 14, characters "re-output" are used as the identification information B11 as an example, but the identification information B11 is not limited to the characters "re-output". The content, arrangement, color, etc. of the identification information B11 may be changed as appropriate as long as the content indicates re-output.

Figure 15A:
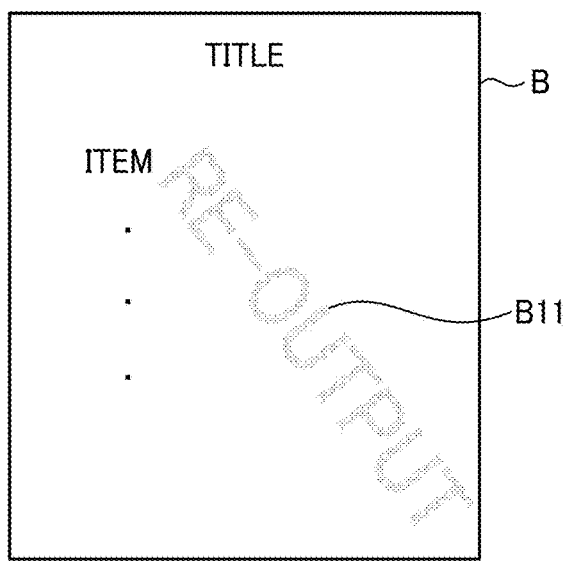
FIGS. 15A and 15B are diagrams illustrating other examples of outputs of the reprinted recording media.
Figure 15B:
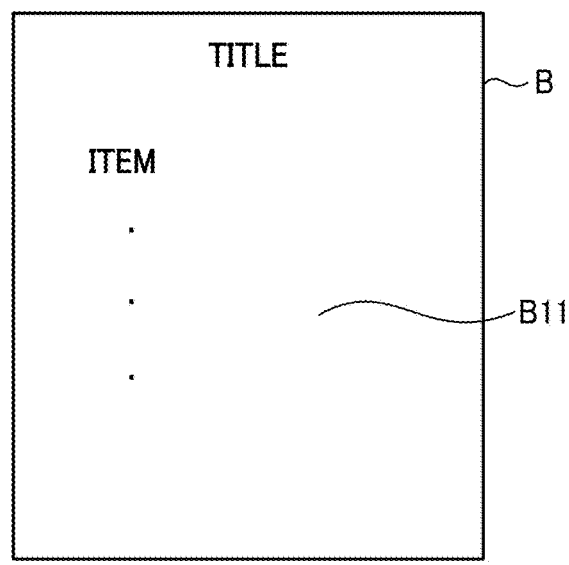

FIGS. 15A and 15B are diagrams illustrating other examples of outputs of the reprinted recording media. FIG. 15A is an image read by an invisible light irradiation by a reading device, and FIG. 15B is an image visible to the human eye under visible light.

As illustrated in FIGS. 15A and 15B, the identification information B11 indicating reprinting is not confirmed under visible light in FIG. 15B but confirmed by the read image of invisible light irradiation as illustrated in FIG. 15A. An invisible recording material is used for the reprint identification information B11.

As described above, the reprinted characters can be confirmed by reading the image with invisible light, and the image is identified as a reprinted image. In addition, since the reprinted characters are invisible under visible light, the content of the document is easier to read.

In addition, by using the invisible recording material, reprint information can be added without considering about a layout of the content originally described in the document.

As described above, since the image forming apparatus 1 according to the modified example 6 outputs the re-output notification on the recording medium B, the external device is able to recognize the re-output by the recording medium B.

The image forming apparatus 1 may notify the external device of the detection result using log information.

Figure 16:
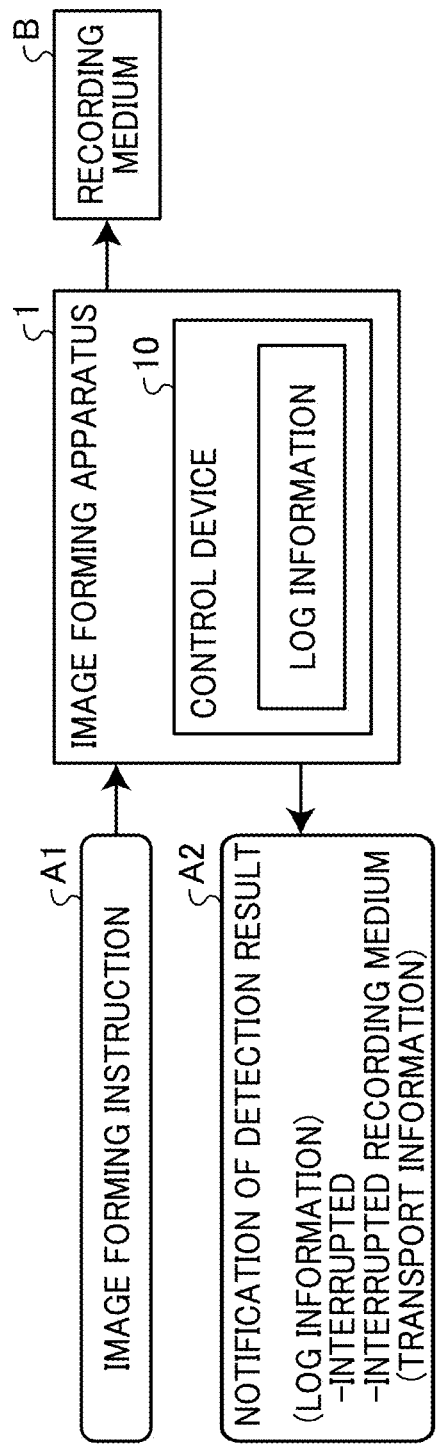
FIG. 16 is a block diagram illustrating an example of a configuration of the image forming apparatus according to a modified example 7.

FIG. 16 is a block diagram illustrating an example of a configuration of the image forming apparatus according to the modified example 7. As illustrated in FIG. 16, the image forming apparatus 1 notifies the log information to the external device. The log information includes time of interruption, error type, and information indicating the transport status of the recording medium detected in chronological order.

The external device manages the recording medium on which the image is formed by acquiring the log information. For example, among the recording media detected in chronological order, the interrupted recording media, the transport status of the recording media, and the like are grasped and managed from the log information.

As described above, the image forming apparatus of the modified example 7 notifies the log information, and the status of the recording medium can be managed in detail.

Figure 17:
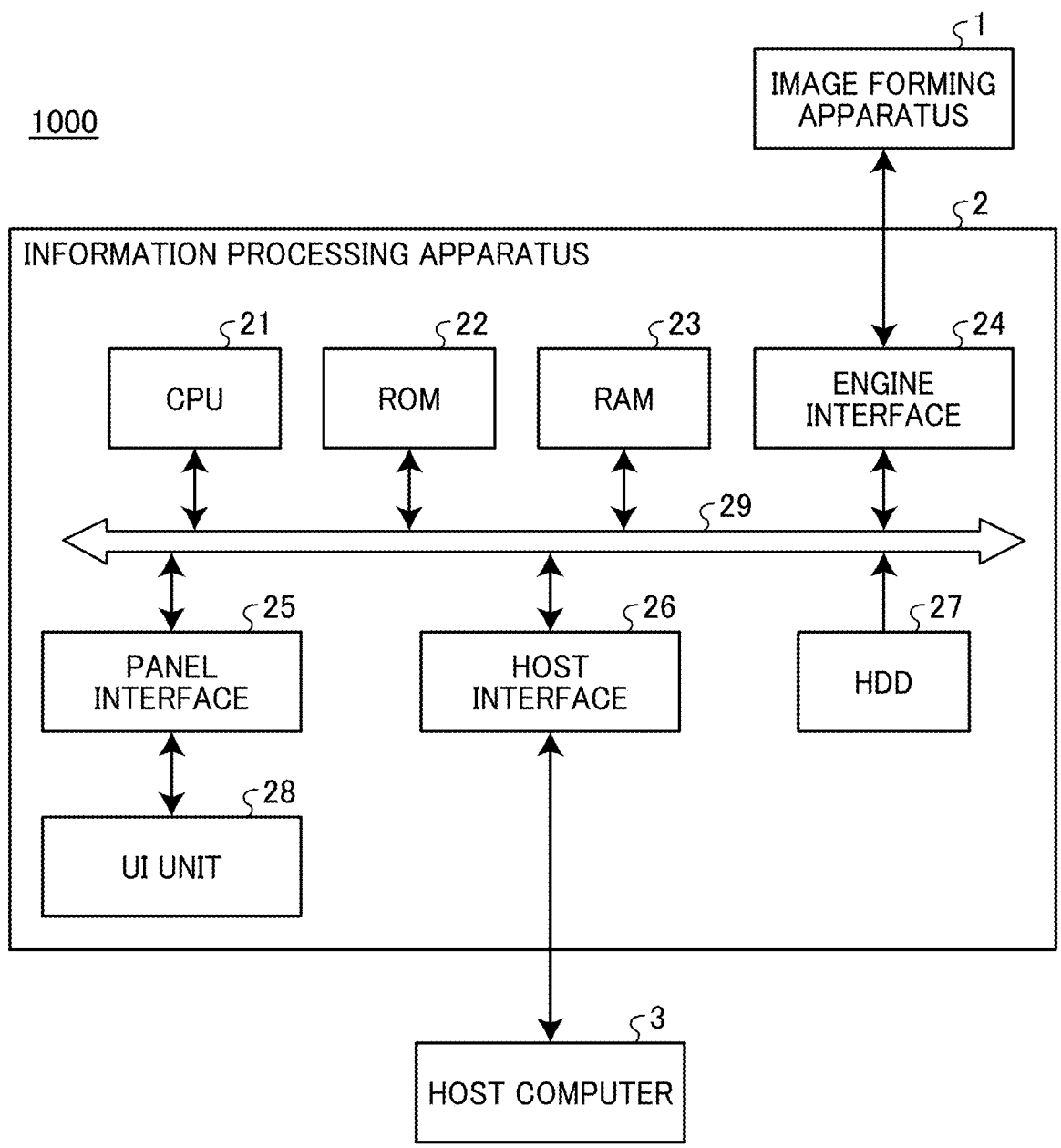
FIG. 17 is a block diagram illustrating an example of a hardware configuration of an entire system according to a second embodiment.

FIG. 17 is a block diagram illustrating an example of a hardware configuration of an entire system 1000 according to a second embodiment. An information processing apparatus 2 and the image forming apparatus 1 illustrated in FIG. 17 are configured to be communicable. Further, the information processing apparatus 2 can be connected to a host computer 3. The number of image forming apparatuses 1 that can communicate with the information processing apparatus 2 is not limited to one and may be plural. Further, the information processing apparatus 2 and the image forming apparatus 1 may communicate through a network (for example, a local area network (LAN), and the like), or may communicate at a short distance using BLUETOOTH (registered trademark) or the like.

The host computer 3 instructs the information processing apparatus 2 to form an image. In the case the host computer 3 is a users personal computer (PC), the information processing apparatus 2 is instructed to form an image through the network.

The information processing apparatus 2 is a management server that manages image forming instructions received from the host computer 3 and recording medium B on which images are formed by the image forming apparatus 1 based on the image forming instructions using unique identification information. Such a system is, for example, a document management system in which the image forming apparatus 1 is a printing apparatus and the information processing apparatus 2 is a document management server.

The information processing apparatus 2 includes a central processing unit (CPU) 21, a read only memory (ROM) 22, a random access memory (RAM) 23, an engine interface 24, a panel interface 25, a host interface 26 and a hard disk drive (HDD) 27. The CPU 21, ROM 22, RAM 23, engine interface 24, panel interface 25, host interface 26 and HDD 27 are connected through a bus 29.

The CPU 21 executes a predetermined management program to manage recording media to which unique identification information is assigned.

The ROM 22 stores fixed programs. The RAM 23 has a storage area as a work area of the CPU 21. The HDD 27 stores management programs, management tables, and the like.

The panel interface 25 is a connection interface with a user interface (UI) unit 28.

The UI unit 28 is a display unit and an input unit of a display panel. The UI unit 28 performs screen display on the display unit and receives user input on the input unit. The display unit includes a display screen such as a liquid crystal panel.

The input unit may be a touch panel provided on the display screen, a keyboard, a mouse, or the like.

The host interface 26 is a connection interface with the host computer 3.

The engine interface 24 is a connection interface with the image forming apparatus 1.

The engine interface 24 outputs an image forming instruction to the image forming apparatus 1.

The image forming apparatus 1 includes the image forming engine 30 that applies, for example, the electrophotographic method or inkjet method. The configuration of the image forming apparatus 1 is described in the first embodiment, and thus detailed illustration and description thereof is omitted as appropriate.

Figure 18:
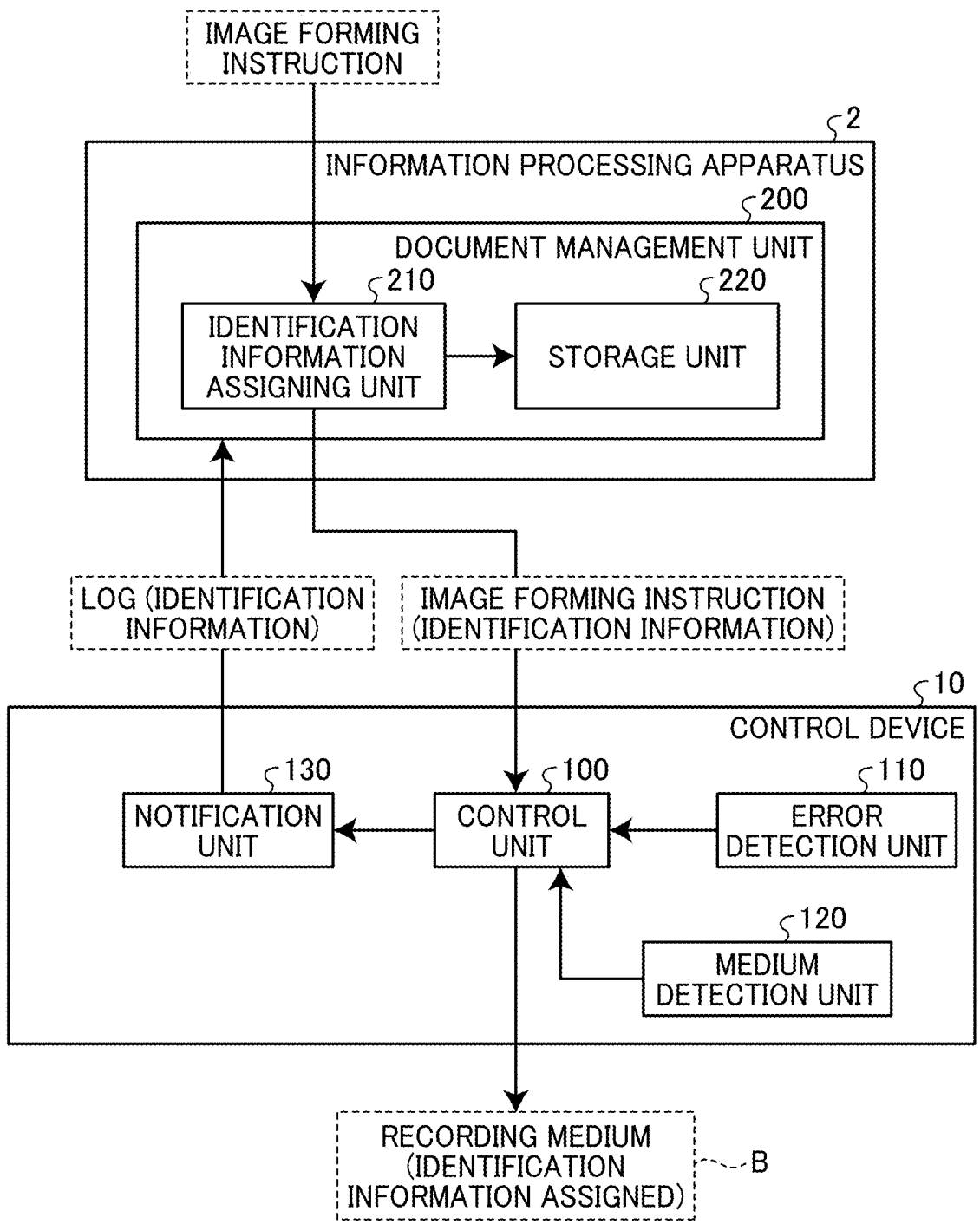
FIG. 18 is a block diagram illustrating an example of a functional configuration of the entire system.

FIG. 18 is a block diagram illustrating an example of a functional configuration of the entire system. As illustrated in FIG. 18, the information processing apparatus 2 includes a document management unit 200. The document management unit 200 is a functional unit implemented by the CPU 21 of the information processing apparatus 2 executing a management program.

The document management unit 200 includes an identification information assigning unit 210 and a storage unit 220. The identification information assigning unit 210 assigns unique identification information (an ID as an example) to the image data included in the image forming instruction in response to receiving the image forming instruction. Further, in the case the image data includes a plurality of pages, the identification information assigning unit 210 assigns unique identification information to each page. The storage unit 220, which is implemented by any desired memory, stores the unique identification information and image data.

In response to receiving the image forming instruction from the host computer 3, the information processing apparatus 2 outputs the image forming instruction to which the identification information is assigned by the identification information assigning unit 210 to the image forming apparatus 1.

In the image forming apparatus 1, the control device 10 receives the instruction from the information processing apparatus 2, and forms an image of the image data to which the identification information is assigned on the recording medium B.

Further, the control device 10 notifies the information processing apparatus 2 of a log in response to a completion of the image forming for the instructed number of pages and copies. The contents of the log include, for example, unique identification information for each page, the date and time of image forming, and the number of completed pages regarding the recording medium on which the image is formed. In addition, when the processing is interrupted, the detection result of the interrupted recording medium is also notified.

In the information processing apparatus 2, the document management unit 200 receives the log from the image forming apparatus 1 and stores the log in the storage unit 220. As a result, the recording medium on which the image is formed by the image forming apparatus 1 can be managed by the document management unit 200.

A program to be executed by each device of each embodiment may be provided by being incorporated in a ROM in advance. In addition, files in installable format or executable format may be recorded on computer-readable recording medium such as compact disc-read only memory (CD-ROM), flexible disks (FD), compact disc-recordable (CD-R), and digital versatile disc (DVD). Alternatively, the software may be stored on a computer connected to a network such as the internet, and provided by being downloaded through the network.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:
an image forming engine to form an image on a recording medium; and
circuitry configured to:
  interrupt an image formation by the image forming engine in response to a malfunction;
  detect a recording medium on which the image formation is interrupted;
  notify an external device of a detection result of the recording medium;
  detect an image forming status of the recording medium on which the image forming is interrupted from a relative positional relationship of the recording medium with respect to a transfer mechanism and an image area size of the recording medium; and
  notify the external device of information indicating the image forming status of the recording medium on which the image formation is interrupted,
wherein the image forming status indicates a degree of completion of transferring the image onto the recording medium.

2. The image forming apparatus of claim 1, wherein the circuitry is configured to:
  notify the external device of the recording medium detected as not ejected based on the relative positional relationship of the recording medium with respect to the transfer mechanism.

3. The image forming apparatus of claim 2, wherein the image forming engine forms the image using an electrophotographic method, and the circuitry is configured to:
  detect a status of an image forming process of the recording medium on which the image formation is interrupted; and
  notify the external device of the status of the image forming process of the recording medium on which the image formation is interrupted.

4. The image forming apparatus of claim 2, wherein the circuitry is further configured to:
  control the image forming engine to form the image on another recording medium after the interruption; and
  notify the external device of information indicating that the image is formed on the other recording medium.

5. The image forming apparatus of claim 4, wherein the circuitry is further configured to control the image forming engine to add, to the other recording medium, identification information indicating that the recording medium is a recording medium on which the image is re-printed.

6. The image forming apparatus of claim 5, wherein the circuitry is further configured to control the image forming engine to form the identification information on the recording medium using an invisible recording material.

7. The image forming apparatus of claim 1, wherein the circuitry is further configured to:
  store in a memory, power off information indicating that power of the image forming apparatus is turned off at an unintended timing;
  send a notification indicating the power off information in response to turning on of the power after the power is turned off;
  detect the recording medium on which the image formation is interrupted due to the power off at the unintended timing, based on the notification of the power off information; and
  notify the external device of the detection result of the recording medium detected in response to the turning on of the power.

8. The image forming apparatus of claim 1, wherein the circuitry is further configured to control the image forming engine to output information indicating the detection result to the recording medium.

9. The image forming apparatus of claim 1, wherein the circuitry is further configured to notify the external device of the detection result by transmitting log information to the external device.

10. A system comprising:
an image forming apparatus including:
  an image forming engine to form an image on a recording medium;
  circuitry configured to interrupt an image formation by the image forming engine in response to a malfunction;
  one or more sensors to detect a recording medium on which the image formation is interrupted; and
  a communication interface to transmit a notification to an external device indicating a detection result of the recording medium; and
an information processing apparatus comprising apparatus circuitry configured to manage the recording medium using identification information indicated in the detection result,
wherein the circuitry is further configured to:
  detect an image forming status of the recording medium on which the image forming is interrupted from a relative positional relationship of the recording medium with respect to a transfer mechanism and an image area size of the recording medium, and
  notify the external device of information indicating the image forming status of the recording medium on which the image formation is interrupted, and
  wherein the image forming status indicates a degree of completion of transferring the image onto the recording medium.

11. The system of claim 10, wherein the circuitry is configured to:
  notify the external device of the recording medium detected as not ejected based on the relative positional relationship of the recording medium with respect to the transfer mechanism.

12. The system of claim 10, wherein the circuitry is further configured to:
- store in a memory, power off information indicating that power of the image forming apparatus is turned off at an unintended timing;
- send a notification indicating the power off information in response to turning on of the power after the power is turned off;
- detect the recording medium on which the image formation is interrupted due to the power off at the unintended timing, based on the notification of the power off information; and
- notify the external device of the detection result of the recording medium detected in response to the turning on of the power.

13. The system of claim 10, wherein the circuitry is further configured to:
- control the image forming engine to output information indicating the detection result to the recording medium,
- control the image forming engine to form the image on another recording medium after the interruption; and
- notify the external device of information indicating that the image is formed on the other recording medium.

14. The system of claim 10, wherein the circuitry is further configured to notify the external device of the detection result by transmitting log information to the external device.

15. A method for notifying an external device of information on an interrupted recording medium by an image forming apparatus, the method comprising:
- controlling an image forming engine to form an image on a recording medium;
- interrupting an image formation by the image forming engine in response to a malfunction;
- detecting a recording medium on which the image formation is interrupted;
- notifying the external device of a detection result of the recording medium;
- detecting an image forming status of the recording medium on which the image forming is interrupted from a relative positional relationship of the recording medium with respect to a transfer mechanism and an image area size of the recording medium, and
- notifying the external device of information indicating the image forming status of the recording medium on which the image formation is interrupted,
- wherein the image forming status indicates a degree of completion of transferring the image onto the recording medium.

16. The method of claim 15, further comprising, by the circuitry:
- notifying the external device of the recording medium detected as not ejected based on the relative positional relationship of the recording medium with respect to the transfer mechanism.

17. The method of claim 15, further comprising, by the circuitry:
- storing in a memory, power off information indicating that power of the image forming apparatus is turned off at an unintended timing;
- sending a notification indicating the power off information in response to turning on of the power after the power is turned off;
- detecting the recording medium on which the image formation is interrupted due to the power off at the unintended timing, based on the notification of the power off information; and
- notifying the external device of the detection result of the recording medium detected in response to the turning on of the power.

18. The method of claim 15, further comprising, by the circuitry:
- controlling the image forming engine to output information indicating the detection result to the recording medium;
- controlling the image forming engine to form the image on another recording medium after the interruption; and
- notifying the external device of information indicating that the image is formed on the other recording medium.

19. The method of claim 15, further comprising, by the circuitry, notifying the external device of the detection result by transmitting log information to the external device.

* * * * *